Figure 1:
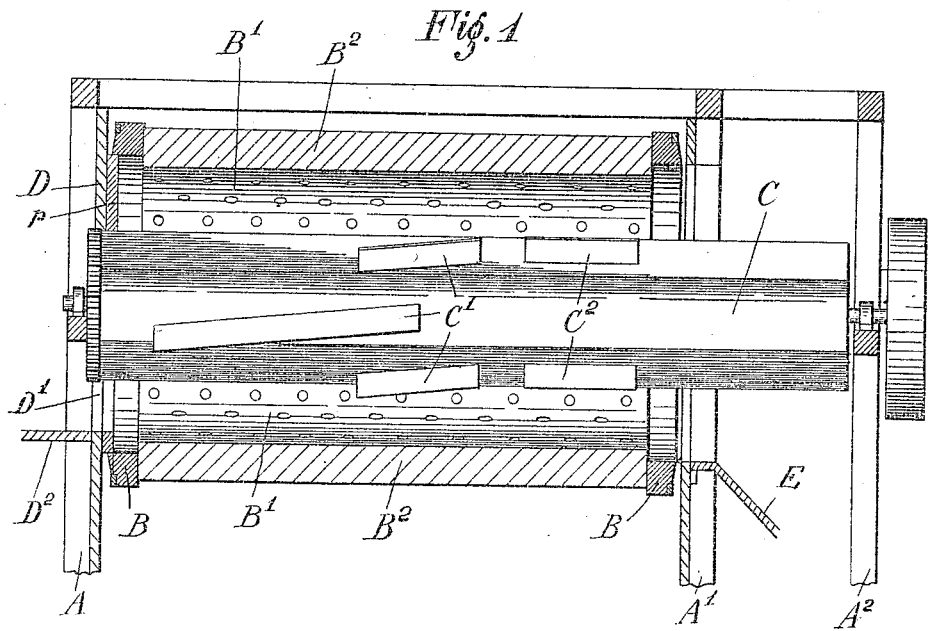

R. P. SCOTT.
MACHINE FOR HULLING GREEN PEAS ON THE VINES.
APPLICATION FILED APR. 6, 1905.

957,442.

Patented May 10, 1910.

Witnesses
Ivan Konigsberg
M. Tcheff

Robert P. Scott  Inventor
By his Attorney
Lyons & Rising

UNITED STATES PATENT OFFICE.

ROBERT P. SCOTT, OF CADIZ, OHIO.

MACHINE FOR HULLING GREEN PEAS ON THE VINES.

957,442.  Specification of Letters Patent.  Patented May 10, 1910.

Application filed April 6, 1905. Serial No. 254,126.

*To all whom it may concern:*

Be it known that I, ROBERT P. SCOTT, a citizen of the United States, residing at Cadiz, Harrison county, Ohio, have invented a new and useful Improvement in Machines for Hulling Green Peas on the Vines, of which the following is a specification.

My invention relates to that class of machines to which bunches of green pea vines, as they are taken from the field, are fed, are then raised to an elevated position, are dropped, and are finally impacted, while falling through the air, by beaters moving with a narrowly defined velocity. Such impact opens not only those pods which happen to be on the surface of the bunch and are directly struck, but it is transmitted for a considerable distance through the mass of vines, and hulls the pods, thus covered by the intervening mass, by indirect impact. But it so happens that green peas are exceedingly delicate and are very liable to injury in the process of hulling, and that the usefulness of the hulled pea berries, when any considerable percentage of them is damaged, is much lessened since such berries, when canned, bring less price on the market. It is thus of the highest consequence to restrict the percentage of damaged berries to the lowest possible amount. This, other conditions being equal, can only be done by reducing the speed of the beaters. But such reduction in beater-speed naturally involves an increase in the percentage of pods which escape from the discharge end of the machine in an unhulled condition. The skilful operator must therefore choose his speed neither too high to damage the pods directly struck on the surface of the bunch, nor too low to let unhulled pods escape from the machine.

The object of my invention is to improve the class of machines which execute the process here under consideration so as to make it possible to reduce the beater speed, thus diminishing the number of damaged berries, without increasing the number of escaping, unhulled pods.

The machine of the class which I am considering comprises a revoluble open-ended outer drum covered with perforated rubber and having elevating ribs. This drum is mounted on travelers or rollers, the rotation of the drum causing the elevating ribs to raise the bunches of vines to an elevated position in the upper half of the drum and then to drop them.

It comprises furthermore an inner drum carrying beaters to strike the falling bunches of vines and moving at velocities sufficient to accomplish the purpose intended. These beaters are slanted, that is they are mounted on the drum at an angle to the axis of the machine. The result is that so long as the bunches of vines rest in contact with the outer drum they move in planes perpendicular to the axis of the machine but when the falling bunches of vines are struck, they move in a trajectory which has a trend toward the discharge end. With a given length of outer cylinder, it is therefore plain that the greater the slant of the beaters, that is the greater the angle which it makes with the axis of the machine, the less will be the number of times in which a given bunch of vines is struck in its passage from the feed to the discharge end.

Such being the construction of the class of machine which I am improving, my invention consists in using therein a slant of beater at the discharge end which is less than the slant of the beaters at the feed end or, still more specifically stated, my invention consists in using slanting beaters at the free end and straight beaters at the discharge end.

The operator chooses a beater speed which will cause the pods most easily opened to be hulled before they have passed say half-way through the machine. This speed will be too low to damage the hulled peas. A pod having once been hulled, the peas therein escape from the machine through the perforations in the covering of the outer machine. But there remain, toward the tail end of the machine, those refractory pods which resist the hulling process more vigorously. It will not do to raise the beater speed to hull such refractory pods; this will simply damage the berries. I have discovered, however, that one reason the pods under consideration are refractory to hulling is because there are fewer points on their surface and fewer positions relative to the direction of impact, in which, at a given speed, they will be hulled. If these refractory pods are to be opened at a moderate speed, it seems they must be struck at certain points only of their surface. But as the machine has no power to control the exact point on the pods which the impact reaches, it follows the refractory pods must be struck a greater number of times in order that, during some one of these times, they may receive the impact at the proper points to hull them. This repeated impact of pods at the tail end of the machine, I bring about by diminishing the slant of my tail end beaters.

To avoid misapprehension I may say that I do not tie my invention to any matter of theory. I merely state as a fact, obtained as the result of a long series of experiments, that with my invention the beater speed may be reduced from 5 to 10% without increasing the percentage of unhulled pods which pass out of the machine. But the hitherto permissible limits of beater speed in this class of machine vary by but little over 10%.

Figure 2:
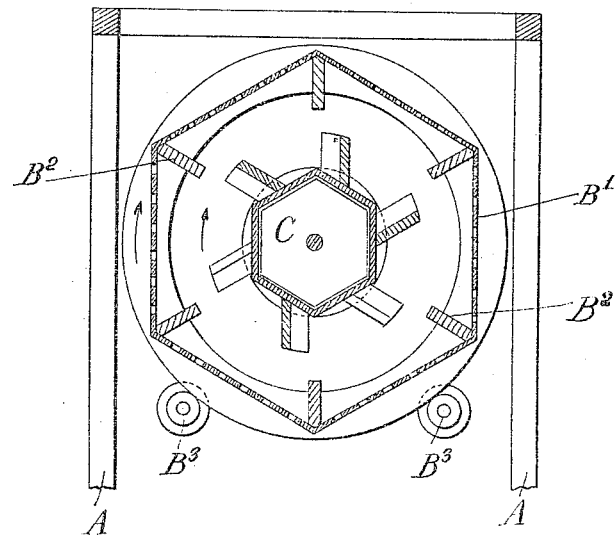

In the drawings,—Figure 1 shows a longitudinal section of my machine; and Fig. 2 shows a transverse section.

The machine under consideration comprises frames A, A', A². An outer revoluble drum is composed of annular ends B connected by elevating ribs B², and is provided with a perforated cover B'. This outer drum rotates on travelers or rollers B³, mounted on the frames A, A'. The inner drum C carries longitudinally disposed beaters C', C², and is journaled in bearings in the frames A, A², so that the inner drum extends through and beyond the outer drum at the discharge end. A face plate D, having a feed hole D', to which face plate is fastened a further guard ring $p$, is secured to the frame A and covers the feed end of the outer drum. This prevents bunches of vines, after they have once been fed into the machine, from again falling out of the same at the feed end. A feed board D² coöperates with the feed hold D'. At the discharge end, I may use a chute E down which the hulled vines fall.

I have not undertaken to show the separating apron used in this class of machines or the straw carrier, since they form no part of my present invention.

It will be noticed that the beaters C² at or near the tail end of the machine have less axial slant, that it makes a smaller angle with the axis of the machine, than the beaters in the central portion or at the feed end. In fact I may use tail end beaters with no axial slant at all, that is parallel to the machine axis, as I have shown in the drawings. Such axially non-slanted beaters may be termed straight beaters. By this construction, I attain the objects set forth in the preceding portions of the specification.

I claim,—

1. A machine for hulling green peas from masses of vines comprising the combination of a revoluble outer drum having elevating ribs for raising the vines to the upper half of the drum and then dropping them, a cover with perforations for permitting the hulled peas to escape therethrough, and a revoluble inner drum provided with longitudinally disposed but axially slanted beaters for striking the falling bunches of vines, the beaters at the tail end of the machine being more nearly parallel to the machine axis than the rest, substantially as described.

2. A machine for hulling green peas from masses of vines comprising the combination of a revoluble outer drum having elevating ribs for raising the vines to the upper half of the drum and then dropping them, a cover with perforations for permitting the hulled peas to escape therethrough, and a revoluble inner drum provided with longitudinally disposed beaters for striking the falling bunches of vines, said beaters being slanted at the feed end and practically straight at the discharge end, substantially as described.

In testimony whereof I have signed my name to this specification in the presence of two subscribing witnesses.

ROBERT P. SCOTT.

Witnesses:
J. E. DYSART,
W. C. BIGGER.